Oct. 28, 1941.                W. R. GASS                 2,260,566
                         SEMIAUTOMATIC BRAKE
                          Filed Oct. 7, 1940
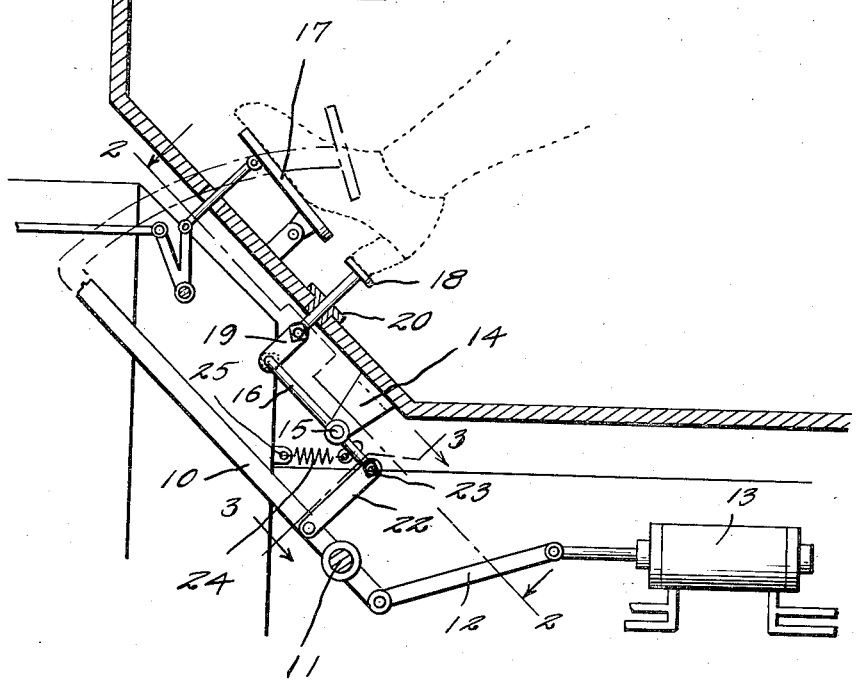
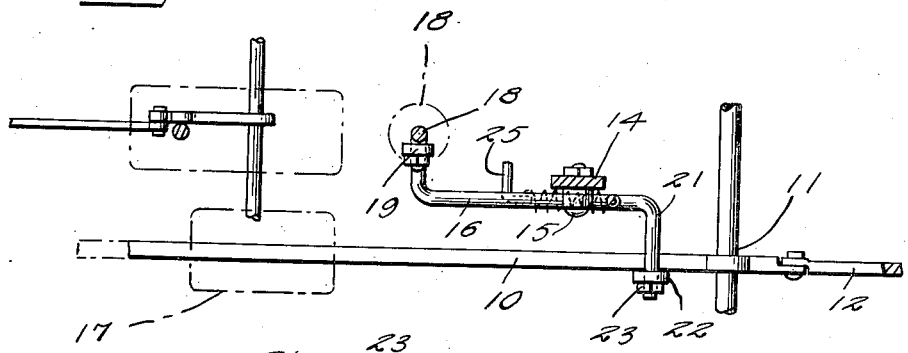
William R. Gass
INVENTOR
BY Victor J. Evans & Co.
ATTORNEYS Patented Oct. 28, 1941

2,260,566

UNITED STATES PATENT OFFICE 2,260,566

SEMIAUTOMATIC BRAKE

William Russell Gass, Sacramento, Calif.

Application October 7, 1940, Serial No. 360,165

3 Claims. (Cl. 188—167)

This invention relates to foot brakes, and more particularly to those of the type in which the brakes are applied when a small pedal is released.

There are several advantages in placing a brake pedal directly behind the gas accelerator, so that, when the operator's foot is removed, the brake will be applied. Chief among these is the fact that less physical motion is required than is required to apply the conventional brake, since the operator's right foot does not have to move from the accelerator to the brake pedal, thereby creating a considerable safety feature. Also when the car is stopped on an incline in traffic, it is not necessary to take the foot from the accelerator to apply the brake or release it, so the car may be started up without using the hand throttle to prevent coasting backwards or stalling. Various devices have been developed utilizing a brake pedal in this position but, so far as I am aware, no one has applied this idea with the specific advantageous combination and arrangement of parts that are embodied in my invention.

The object of this invention is safety and convenience in foot brakes.

Another object is an easily operated foot brake which may be applied without taking the foot off the accelerator.

Another object is a foot brake which is automatically applied when pressure is released on a pedal.

These and other objects may be accomplished by my invention which embodies among its features a foot brake lever, a link on the lever, an auxiliary lever operating said link to apply the brake, a spring on the auxiliary lever to bias it to brake-applying position, and a foot pedal on this lever arranged so that depressing the pedal causes the brake to be retracted and releasing it causes the brake to be applied, said pedal being positioned behind the accelerator so as to be operated by the heel of the driver's foot which rests on the accelerator.

Other objects and features may become evident from the following disclosure when taken in connection with the accompanying drawing in which, Figure 1 is a side elevation of my device, showing the floorboard in cross-section, Figure 2 is a cross-section taken on line 2—2 of Figure 1, Figure 3 is a cross-section taken on line 3—3 of Figure 1.

Referring to the drawing in detail, I contemplate attaching my improved foot pedal structure to the conventional brake which consists (see Figure 1) of a lever 10 fulcrumed on a shaft at 11. The short end of lever 10 operates, through link 12, the braking means proper 13, which is preferably a compressed air, booster, or hydraulic type of conventional construction.

When my invention is applied the original foot brake pedal, shown in dotted lines in Figure 1, may either be left intact or removed by cutting the lever at a suitable point.

The structure which embodies my invention comprises a bracket 14 fixed to the bottom of the floor-board and holding the pivot 15 of the lever 16. Forward end of lever 16 is at a point, under the floorboard, directly behind the accelerator 17, and lever 16 is operated by a pedal 18, connected thereto by link 19 and extending through bushing 20 to a position where it may be operated by the heel of the operator's foot which rests on the accelerator.

The opposite end of the lever is bent as at 21 to cover the space between the accelerator and the brake lever, and there is a link 22 between the end 23 of the lever and the brake lever 10. A coil spring 24 is attached between the operative side of lever 16 and a bracket 25 fixed on the crank case or some suitable part of the chassis. Accordingly, the lever 16 is biased to operate the brake lever 10 to put on the brake and it will be noted that when the pedal 18 is depressed against the action of spring 24 the brake will be held released.

Therefore, when the car is operated, the driver depresses pedal 18 with the heel of his accelerator foot to release the brake and, as long as his foot stays in this position, heel resting on pedal, the brakes are kept off. If, however, he wishes to stop quickly, he releases pedal 18 with the same motion as raising his foot from the accelerator to cut off the gas. This, as explained above, causes the brakes to be applied. Although a preferred embodiment is described herein, I do not wish to be limited thereto but only by the scope of the appended claims.

What is claimed is:

1. In a device of the class described, a brake lever, a spring-operated auxiliary lever linked thereto and being spring pressed to cause application of the brakes, and a foot pedal linked to the auxiliary lever positioned to operate against the spring when depressed and thereby hold the brakes retracted.

2. In a device of the class described, a foot brake lever, an auxiliary lever linked thereto, a spring attached to the auxiliary lever between the fulcrum and the brake lever link to cause the brake lever to apply the brakes, and a foot pedal linked to the auxiliary lever on the other side of the fulcrum and operative, when the pedal is depressed, to work against the spring and cause retraction of the brakes.

3. In a brake device for an automotive vehicle having means for applying a braking force to the wheels thereof and an operating lever connected to said brake applying means, an auxiliary lever connected to the said operating lever, means yieldingly acting to swing the lever mechanism to brake applying position, and a pedal connected to the auxiliary lever mounted, when depressed, to swing the said levers to brake releasing positions.

WILLIAM RUSSELL GASS.